Nov. 10, 1931.  C. J. CLARKE  1,831,738
FISHING REEL
Filed Nov. 19, 1929
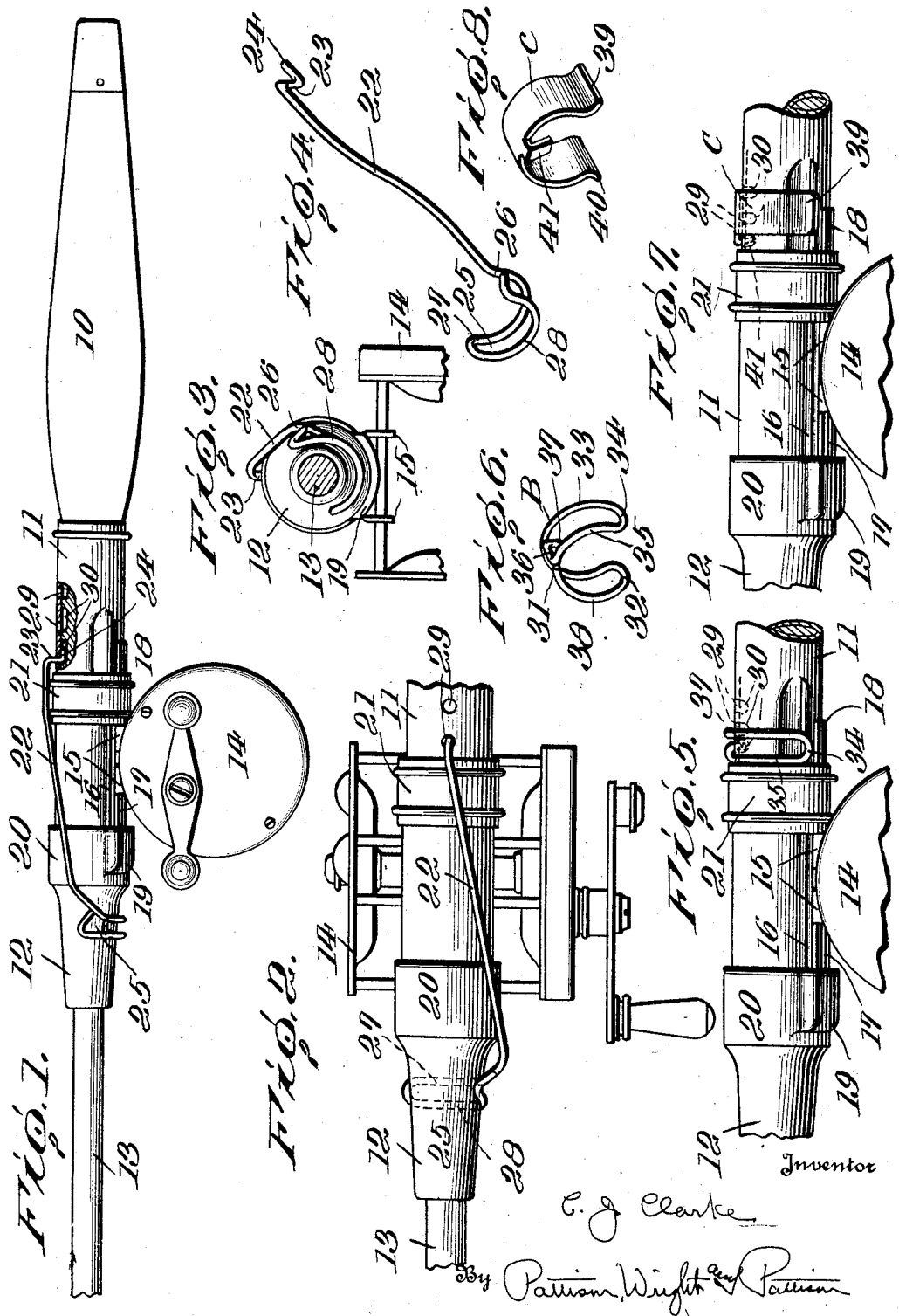

Patented Nov. 10, 1931

1,831,738

UNITED STATES PATENT OFFICE

CHARLES J. CLARKE, OF KINGSBURG, CALIFORNIA

FISHING REEL

Application filed November 19, 1929. Serial No. 408,341.

This invention relates to improvements in fishing reels but is more specifically directed to a device for locking the reel against displacement from the rod once it has been properly positioned thereupon.

In the ordinary construction of fishing rods the reels are removable therefrom and in the structure of those devices most generally in use there is present a loose or sliding clamp or band for locking and clamping one end of the fishing reel base against the tubular rod, and the present invention is directed to a device for locking or guarding this clamping band against displacement once it has been moved into a locking or clamping position upon the reel base.

In view of the above, it will be apparent that one of the primary objects of the invention is the provision of a device for locking the clamping means of a reel fastener against displacement.

Another object of the invention is the provision of a device of the character outlined above, which is cheap and simple of manufacture and highly efficient in operation.

A still further object of the invention is the provision of a device for the purpose described which is of a construction to permit its ready adaptation to fishing rods and reels now in use with very minor alterations to the rod, whereby a very marketable device is provided.

Other objects, novel features of construction and improved device of the invention will appear from the following description taken in conjunction with the accompanying drawings.

In the drawings;

Figure 1 is a view in side elevation of a fishing rod and reel having the improved invention applied thereto.

Fig. 2 is a detailed plan view illustrating the application of the improved device to a fishing rod and reel.

Fig. 3 is an end view, the rod being shown in transverse vertical section.

Fig. 4 is a detailed perspective view of the locking device per se.

Fig. 5 is a detailed view in side elevation of an alternate form of locking device.

Fig. 6 is a perspective view illustrating the locking device appearing in Fig. 5.

Fig. 7 is a detail view in side elevation showing the application of a still further alternate form of the invention.

Fig. 8 is a perspective view of the alternate form of locking device illustrated in Fig. 7.

Reference now being had to the drawings, it will be seen that in all of the figures where the rod and reel appear, these members are of the conventional or well-known type found in general use, in that there is a fishing rod, butt or handle 10, a tubular portion 11, forming the reel seat to which is attached, by means of a combined fixed ferrule and a ring 12, or its equivalent, the rod portion proper 13.

Inasmuch as the reel can be of any desired form, it is designated as an entirety by the numeral 14 and is provided with an elongated base 15, which on its under side is rounded so that it can seat properly upon the tubular reel seat portion 11, with its edges in engagement with the longitudinal struck-out portions or fins 16. The ends 17 and 18 of this reel base are tapered towards the main-base portion 15 so that they increase in thickness as they approach the center portion of the reel base.

The reel 14 is fastened upon the reel support portion 11 of the rod in a conventional manner by having its one end 17 slid beneath the raised portion 19 of the ring 20, which forms a part of the ferrule 12, while the opposite loose end 18 of the reel base is clamped against the reel support 11 by sliding the loose ring or band 21 inwardly over the end 18 of the base in a manner illustrated in the drawings.

Thus far there has been described only a conventional or well-known structure commonly found in fishing rods and reels on sale and extensively used. A description will now be given of the improved locking device forming this invention.

Referring to Fig. 4, of the drawings wherein the locking device is illustrated separately, it will be seen that it is made in one integral piece and to function properly it must be made of spring material. This integral piece of spring material need not necessarily be of a circular form or shape in cross-section, although it is so illustrated. The locking device composed of spring material, comprises a main portion 22, which at one end is bent downwardly, as at 23, and then has a short extending end-portion 24, which lies in a plane at a slight angle to the main portion 22, although it is almost parallel therewith. The opposite end of the spring material is bent in the form of a semi-circle, as appears at 25 and due to the downwardly bent portion 26, this semi-circular bend lies in a plane below the main straight portion 22, and to one side thereof when viewing the device as it appears in Fig. 4 of the drawings.

For the purpose of illustrating this invention, the locking device is illustrated as being made of spring wire, and for the purpose of adding strength and rigidity to the device the semi-circular portion is made of two thicknesses of wire in that it is composed of two parallel strands 27 and 28. It should be understood, however, that this particular way of forming the semi-circular portion need not be strictly followed, as only one strand of wire could be used, or if the locking device were made of spring material other than wire, one strand or thickness of the same might of itself be sufficiently strong to do away with the principle of the parallel portions of the spring material at this end of the device.

To adapt the fishing rod and reel to the application of this locking device is but the work of a few moments, as it is only necessary to drill a hole 29 through the reel supporting portion 11 of the rod at a point thereon opposite to that assumed by the end 18 of the reel base and slightly forward of that end. It will also be necessary to drill out slightly the butt portion which penetrates the reel support 11, as designated at 30.

With the hole 29 and the cavity 30 drilled out and the reel locked upon the rod in the usual conventional manner, the locking device is then applied by inserting the end 24 thereof through the hole 29 and swinging the semi-circular portion 25 of the locking device beneath the ferrule portion 12. It will then be seen that the end 24 has assumed a position to bear against the under side or face of the tubular portion 11 of the reel seat and that the semi-circular portion 25 is locked under spring tension into engagement with the ferrule 12 and that the locking device can not be removed without deliberately depressing the semi-circular portion and then swinging it to one side and out of engagement with the ferrule.

With the locking device in the place illustrated in Fig. 1 of the drawings, it will be seen that the portion 23 of the lock absolutely prevents the clamping ring or band 21 from any recession from the end 18 of the reel base and that consequently as long as the lock is in position the reel will be tightly held in position by this clamped ring or band 21.

Referring now to Figures 5 and 6 of the drawings, in which one of the alternate forms of the invention is illustrated, it will be seen here that the locking device, which is designated as an entirety B, is composed of one integral piece of spring wire material formed into a semi-circular shape. One end of the wire appears at 31 and the wire after being bent into a loop 32 is bent into a semi-circular form 33, which terminates in a loop 34 with the opposite end of the wire being bent to have a portion 35 parallel in separated relation, the portion 33 with the end of the wire terminating in an inward extending portion 36 in the space between the portions 33 and 35. This portion 36 in turn terminates in a downwardly extending portion 37. It will be seen that the portion 38 of the wire, between the end 31 and the loop 32 parallels in separated relation a portion of that portion 33 of the wire, with the result that the portions 35 and 36 of the wire together form a semi-circular shape which is in parallel separated relation with the portion 33 of the wire, with the end 31 abutting the portion 36 where it turns off from the wire portion 35.

This semi-circular shaped lock is made of a diameter slightly less than the external diameter of the reel supporting portion 11 of the rod, with the result that as it is composed of spring material it can be expanded sufficiently to be forced upon the portion 11 in the manner illustrated in Fig. 5 of the drawings, with the downwardly extending end 37 of the lock extending into the hole 29 and cavity 30, heretofore mentioned. When the lock is positioned in the manner illustrated in Fig. 5 of the drawings, the portions 35 and 38 of the lock engage the rear end of the slidable clamping ring 21 and hold it against displacement from its locked or clamping position.

Referring now to the alternate form, illustrated in Figs. 7 and 8 of the drawings, it will be seen that the lock is made in the form of a band of spring material, which is designated as an entirety C. This band is bent into a semi-circular shape with its ends flared slightly outward, as appear at 39 and 40. At one edge and central of its length, the band is provided with an outwardly and downwardly extending L-shaped lug 41. The internal diameter of this lock C is slightly less than the external diameter of the reel supporting portion 11 of the rod, with the result that it can be sufficiently expanded to be pushed upon the rod portion 11 and frictionally engage the same, with its lug portion 41 entering the hole 29 and the cavity 30.

With this lock applied in the manner illustrated in Fig. 7 of the drawings, it will be seen that the lug 41 will absolutely prevent any displacement of the clamping ring 21, so that the reel when once clamped in position by this ring will remain so clamped insolong as the lock C is in position. Due to the upwardly flared ends 39 and 40 of this lock, it can be readily and quickly removed from the rod.

Having thus described my invention, what I claim and desire to secure by Letters Patent is:

1. In combination with a reel-fastening for fishing rods comprising a movable clamp, a lock for locking said clamp against displacement, said lock at one end having engagement with the rod at one side of said movable clamp and its other end extending over and beyond the opposite side of the movable clamp and having engagement with the rod at a point in front of said movable clamp.

2. In combination with a reel-fastening for fishing rods, comprising a sliding clamp ring, said rod back of said ring being provided with an opening, a lock for locking said clamp ring against displacement, said lock having one end retained within said opening, and the opposite end of the lock formed into a semi-circular shape and having engagement under spring tension with the rod at a point in front of said clamp ring.

3. In combination with a reel-fastening for fishing rods comprising a sliding clamp ring, said rod back of said ring being provided with an opening, a lock for locking said clamp ring against displacement, said lock composed of elongated spring material having one end positioned in the opening formed in the rod and the other end of the lock being formed into a semi-circular shape and resiliently engaging the rod at a point in front of said clamp ring.

4. In combination with a reel-fastening for fishing rods, comprising a sliding clamping member, said rod back of said member being provided with an opening, a lock for said clamping member composed of spring material positioned on said rod behind said ring and retained thereupon under spring tension and through engagement with the opening provided in the rod.

5. In combination with a reel-fastening for fishing rods comprising a sliding clamping member, a lock for locking said clamping member against displacement, said lock composed of spring wire bent into a semi-circular shape and provided with an extension, said rod immediately behind said clamping member being provided with an opening, said ring being retained against vertical displacement on said rod through resilient engagement therewith and lateral displacement on said rod by reason of its extension having engagement with said rod opening, the said lock preventing rearward movement of the clamp, for the purpose described.

6. In combination with a reel-fastening for fishing rods comprising a sliding clamp ring, a lock for locking said clamp ring against displacement, said lock comprising an elongated wire having one end bent into a semi-circular shape and its opposite end bent into an L-shape, said rod back of said clamp ring being provided with an opening, the L-shaped end of said clamp wire being positioned in said rod opening behind said clamp ring, and the semi-circular shaped end of said lock wire resiliently engaging said rod in front of said clamp ring and at the opposite side of the rod portion provided with the opening.

In testimony whereof I hereunto affix my signature.

CHARLES J. CLARKE.